(12) United States Patent
Wakabayashi et al.

(10) Patent No.: US 6,526,086 B1
(45) Date of Patent: Feb. 25, 2003

(54) BAND NARROWING LASER

(75) Inventors: Osamu Wakabayashi, Hiratsuka (JP);
Hirokazu Tanaka, Hiratsuka (JP);
Tatsuya Ariga, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/423,197

(22) PCT Filed: May 8, 1998

(86) PCT No.: PCT/JP98/02046
§ 371 (c)(1),
(2), (4) Date: Nov. 4, 1999

(87) PCT Pub. No.: WO98/52261
PCT Pub. Date: Nov. 19, 1998

(30) Foreign Application Priority Data

May 9, 1997 (JP) ............................................. 9-119631

(51) Int. Cl.[7] .............................. H01S 3/09; H01S 3/10
(52) U.S. Cl. ............................. 372/69; 372/20; 372/98; 372/99; 372/100; 359/399; 359/362; 250/225
(58) Field of Search .............................. 372/18, 25, 26, 372/28, 32, 69, 92, 98, 99, 101, 102; 359/362, 399; 250/225

(56) References Cited

U.S. PATENT DOCUMENTS

| | | | |
|---|---|---|---|
| 3,813,613 A | * | 5/1974 | Danielmeyer et al. ..... 331/94.5 |
| 3,938,058 A | * | 2/1976 | Yamamoto ................. 331/94.5 |
| 4,873,692 A | * | 10/1989 | Johnson et al. ................ 372/20 |
| 5,095,492 A | * | 3/1992 | Sandstrom .................. 372/102 |
| 5,319,194 A | * | 6/1994 | Yoshizumi et al. ......... 250/225 |
| 5,559,816 A | * | 9/1996 | Basting et al. ................ 372/27 |
| 5,696,778 A | * | 12/1997 | MacPherson .................. 372/4 |
| 5,856,991 A | * | 1/1999 | Ershov ......................... 372/57 |
| 6,101,211 A | * | 8/2000 | Wakabayashi et al. ...... 372/102 |
| 6,317,203 B1 | * | 11/2001 | Wakabayashi et al. ...... 372/102 |

FOREIGN PATENT DOCUMENTS

| JP | 7261100 | 10/1995 |
|---|---|---|
| JP | 1128580 | 5/1998 |

OTHER PUBLICATIONS

International Search Report in PCT/JP98/02046 mailed Aug. 11, 1998.

* cited by examiner

*Primary Examiner*—Paul Ip
*Assistant Examiner*—Cornelius H Jackson
(74) *Attorney, Agent, or Firm*—Varndell & Varndell, PLLC

(57) ABSTRACT

A band narrowing laser having a band narrowing module which narrows by a band narrowing element a band of the laser beam generated from a laser medium, in which wavefront correction means (10) that corrects the wavefront of an incident laser beam and and projects the corrected beam is intalled in the band narrowing module (6) to produce a laser beam with a narrow and stable spectral line width.

12 Claims, 15 Drawing Sheets

BAND NARROWING LASER

TECHNICAL FIELD

This invention relates to a band narrowing laser configured so as to correct wavefront distortions in laser beams generated in a band narrowing module.

BACKGROUND ART

The use of excimer lasers as light sources in steppers used in semiconductor device manufacture is now drawing considerable attention. There are a number of reasons for this. Excimer lasers have short wavelengths, making it possible to extend the limit of light exposure to 0.35 μm and below. With the same resolution, the depth of field is deeper as compared to the g lines or i lines of mercury lamps. The numerical aperture (NA) maybe small. The exposure areas can be made large. And great power can be obtained. These are some of the outstanding advantages that can be expected.

However, when this excimer laser is used as the light source in a semiconductor exposure apparatus, synthetic quartz material is the only lens material that can be used in fabricating the optical system at excimer laser wavelengths (the wavelength of a KrF excimer laser being 248 nm and that of an ArF excimer laser being 193 nm) (it being difficult to machine $CaF_2$). With simple synthetic quartz materials, however, chromatic aberration functions cannot be imparted.

In the case of naturally oscillating light from a KrF excimer laser, for example, the spectral line width is a broad 300 pm wherewith, if unchanged, the chromatic aberration of the exposure apparatus lens cannot be disregarded, and it is not possible to obtain sufficient resolution in the exposure results.

That being so, when an excimer laser is used as the light source in a semiconductor exposure apparatus, the band of the laser beam is narrowed by deploying a wavelength selection element such as an etalon or grating and prism, etc., in the laser resonator.

Inside the light resonator, however, due to various causes, the laser beam wavefront will come to exhibit divergence (broadening) and curvature.

When a slit is made inside the resonator, for example, the light will become a spherical wave after passing through the slit, due to the diffraction produced by the slit.

There are also cases where the wavefront is distorted by the aberration of the optical element itself that is disposed in the resonator. With a transmissive type of optical element such as a prism expander-used as a band narrowing element, for example, due to such facts as (a) that the internal refractive index distribution is not uniformly perfect and (b) that the polished surfaces of the prism are distorted, the wavefront of a laser beam that has passed through such an optical element will exhibit either convex or concave curvature.

Also, when a laser beam having a wavefront exhibiting such curvature strikes a grating of flat shape, the wavelength selectivity of the grating is diminished. That is, when the incident wavefront of a laser beam on a grating has curvature, the laser beam will strike each of the grooves in the grating at a different angle, wherefore the wavelength selectivity of the grating diminishes, and the spectral line width of the, band-narrowed laser beam broadens.

Thereupon, in U.S. Pat. No. 5,095,492, the difficulties noted above are dealt with by bending the grating itself so as to coincide with the wavefront of the laser beam incident on the grating.

More specifically, a band narrowing excimer laser in this prior art, as diagrammed in FIG. 24 has a front mirror 100, a laser chamber 101, an aperture 102, a beam expander 103, a mirror 104, and a grating 105. Therein, moreover, the grating 105 is bent according to the curvature of the wavefront incident on the grating 105 by a curvature generating apparatus such as that diagrammed in FIG. 25.

The curvature generating apparatus diagrammed in FIG. 25 is configured so that the grating 105 is supported at both ends by mounts 107 via balls 106. Therein, the mounts 107 are linked to a pressure plate 109 through springs 108, with one end of a bolt 110 screwed into the pressure plate 109, and the other end thereof screwed into a nut 111 joined to the center of the back side of the grating 105. By turning the bolt 110 and thereby pulling the center of the grating 105 toward the pressure plate, concave curvatures are produced in the grating 105, as diagrammed in FIG. 26.

Also, with this prior art, appropriate grating tension is preset according to the spectral line width of the laser beam, and, based on that setting relationship, a motor 113 is driven and controlled to drive and turn the bolt so that the tension on the grating becomes a set tension corresponding to a value detected by a spectral line width detection sensor 112.

With the prior art described in the foregoing, the grating itself is bent to impart curvature thereto according to a detected laser beam spectral line width.

However, in the grating, in order to control the laser oscillating wavelength to the desired wavelength, it is necessary to control the angle at which the light is incident on the grating. For this purpose, the grating is provided with a turning mechanism such as a turning stage, so that the grating can be turned as indicated by the arrow J in FIG. 24 by the turning mechanism.

Therefore, for the grating in the conventional apparatus described above, in addition to the curvature generating mechanism described for producing curvatures in the grating, it is also necessary to install a turning mechanism to turn the grating. Such a mechanism is not only complex, bulky, and impractical, but the vibration produced when the grating is turned is transmitted to the curvature generating mechanism and that vibration can result in variation in the spectral line width.

With a band narrowing excimer laser, moreover, a large grating is required to get the spectral line width down to or below 1 pm, and it is all but impossible to fabricate a large grating, even if it is flat, that exhibits uniform groove intervals without distortion. What is worse, with the prior art described above, since curvature is to be imparted to such a flat grating, groove interval unevenness and distortion are exacerbated, making it impossible to obtain suitable wavelength selection characteristics.

Furthermore, with the prior art described above, the grating itself is bent to correct the wavefront aberration of the light incident on the grating, giving rise to a problem in that, when there is wavefront aberration in the grating itself, it is not possible to correct that aberration.

An object of the present invention, which was invented in view of the situation described in the foregoing, is to provide a band narrowing laser wherewith laser beams can be obtained which exhibit narrow and stabilized spectral band width.

DISCLOSURE OF THE INVENTION

In this invention, a band narrowing laser having a band narrowing module for band-narrowing and outputting a laser beam generated from a laser medium by a band narrowing element, in which the band narrowing module comprises wavefront correction means for correcting the wavefront of an incident laser beam and outputting that laser beam.

In other words, according to the present invention, wavefront correction means for correcting the wavefront of a laser beam, and outputting that laser beam, are provided in a laser narrowing module.

For this reason, as based on the present invention, laser beams having a very narrow spectrum can be efficiently and stably output. With the present invention, furthermore, there is no bending mechanism for correcting the wavefront aberration of a grating, wherefore the spectral line width can be stabilized when controlling the wavelength.

BEST MODE FOR CARRYING OUT THE INVENTION

Embodiments of the present invention are now described in detail in conjunction with the attached drawings.

Embodiments of the present invention are now described in detail in conjunction with the attached drawings.

Figure 1:
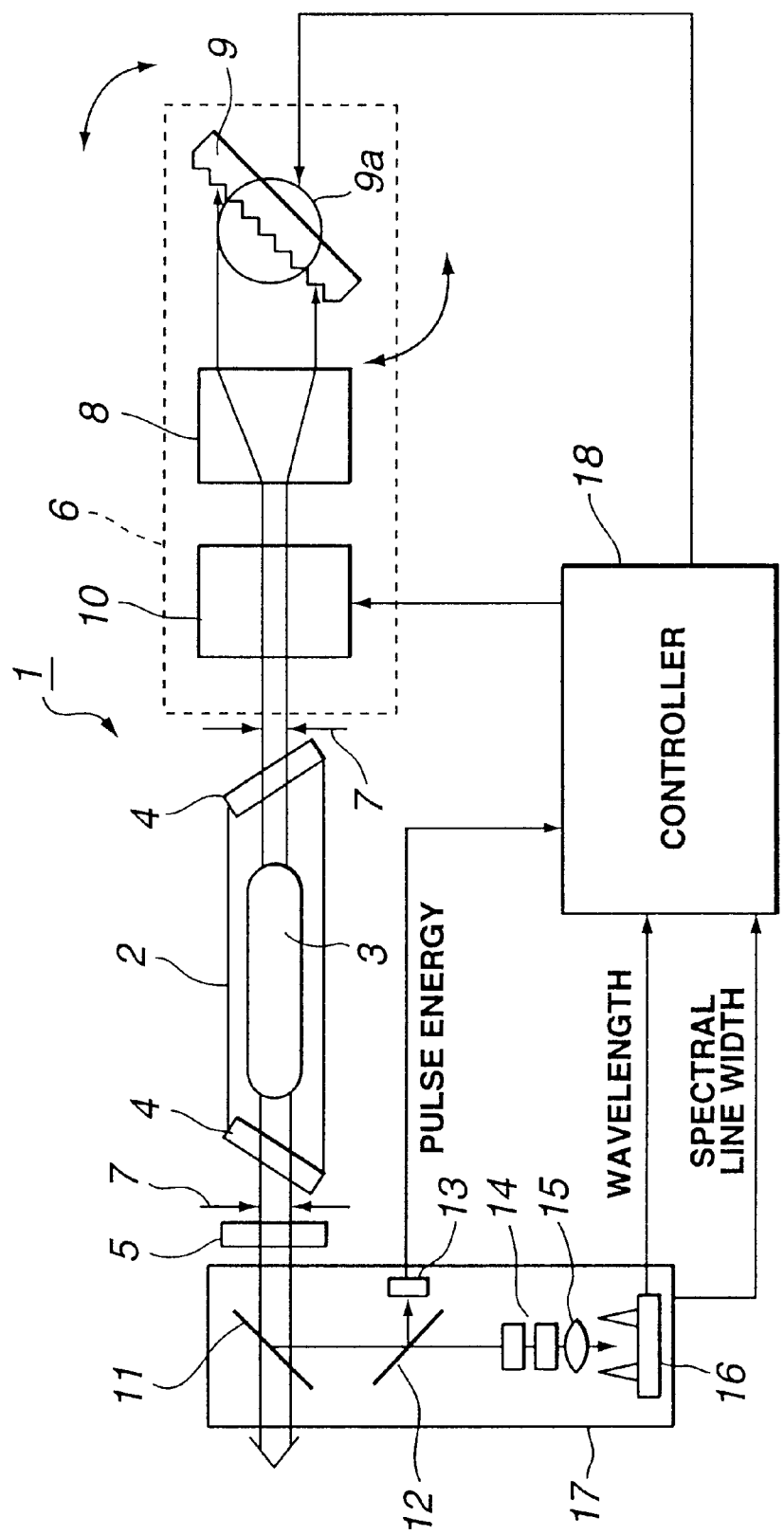
FIG. 1 is a diagram of an embodiment of the present invention.

An embodiment of the present invention is diagrammed in FIG. 1.

In the embodiment diagrammed in FIG. 1, a laser chamber 2 of an excimer laser 1 has discharge electrodes 3 wherewith the anode and cathode are disposed in opposition in a direction perpendicular to the paper surface, such that the laser gas made up of halogen gases, rare gases, and buffer gas, etc., wherewith the interior of the laser chamber 2 is charged, are excited by discharges between the discharge electrodes 3 to effect laser oscillation.

Windows 4 are disposed at the two laser output ports of the laser chamber 2. Also, slits 7 for restricting the beam width are disposed between the laser chamber 2 and the front mirror 5, and between the laser chamber 2 and the band narrowing module 6.

The band narrowing module 6, in this case, is configured of a beam expander. 8, a grating 9 that is an angle-dispersing type wavelength selection element, and a wavefront correction device 10. In this case, the wave front correction device 10 is disposed between the beam expander 8 and the laser chamber 2, and has functions for correcting the wavefront of the incident laser beam and outputting that laser beam. The specific configuration of this wavefront correction device 10 will be described subsequently. The grating 9 is configured so that it can be freely turned by a turning stage 9a.

In other words, in the case of the embodiment diagrammed in FIG. 1, a light resonator is configured between the front mirror 5 and the grating 9.

The laser beam generated in the laser chamber 2 is input to the band narrowing module 6, where the wavefront thereof is first corrected by the wavefront correction device 10, after which the beam is input to the beam expander 8 where its width is expanded. The laser beam is then directed to the grating 9 where it is diffracted, whereby only a prescribed wavelength component of that laser beam is sent back in the same direction as the incoming beam. The laser beam that is sent back by the grating 9, after having its width reduced by the beam expander 8, is input to the wavefront correction device 10, where the wavefront thereof is corrected so that it becomes the same plane wave as when input to the band narrowing module 6, and is, then input to the laser chamber 2.

The laser beam that is amplified as it passes through the laser chamber 2 encounters the front mirror 5 where a part thereof is extracted as the output beam and the remainder is again returned to the laser chamber 2 and amplified.

On the output side of the laser beam is disposed a monitor module 17 comprising a partially reflecting mirror 11, a partially reflecting mirror 12, a photodiode 13, an etalon 14, a condensing lens 15, and a line photosensor 16, etc.

That is, a portion of the laser beam output from the front mirror 5 is sent to the photo diode 13 via the partially reflecting mirror 11 and the partially reflecting mirror 12, and sampled. At the monitor module 17, the value of the pulse energy of the output laser beam is detected from the photo diode 13, which detected value is input to a controller 18.

Meanwhile, the laser beam transmitted through the partially reflecting mirror 12 is input to the line photosensor 16 via the monitor etalon 14 and condensing lens 15, and sampled. At the monitor module 17, the wavelength $\lambda$ of the output laser beam is computed from the positions of the interference fringes produced on the line photosensor 16, and, at the same time, the spectral line width is computed from the width of the interference fringes. The results of these computations are output to the controller 18.

The controller 18 executes discharge voltage control for the discharge electrodes 3 based on monitor signals from the monitor module 17, wavelength control based on the turning of the grating 9, and wavefront correction control based on the wavefront correction device 10, etc.

Figure 2:
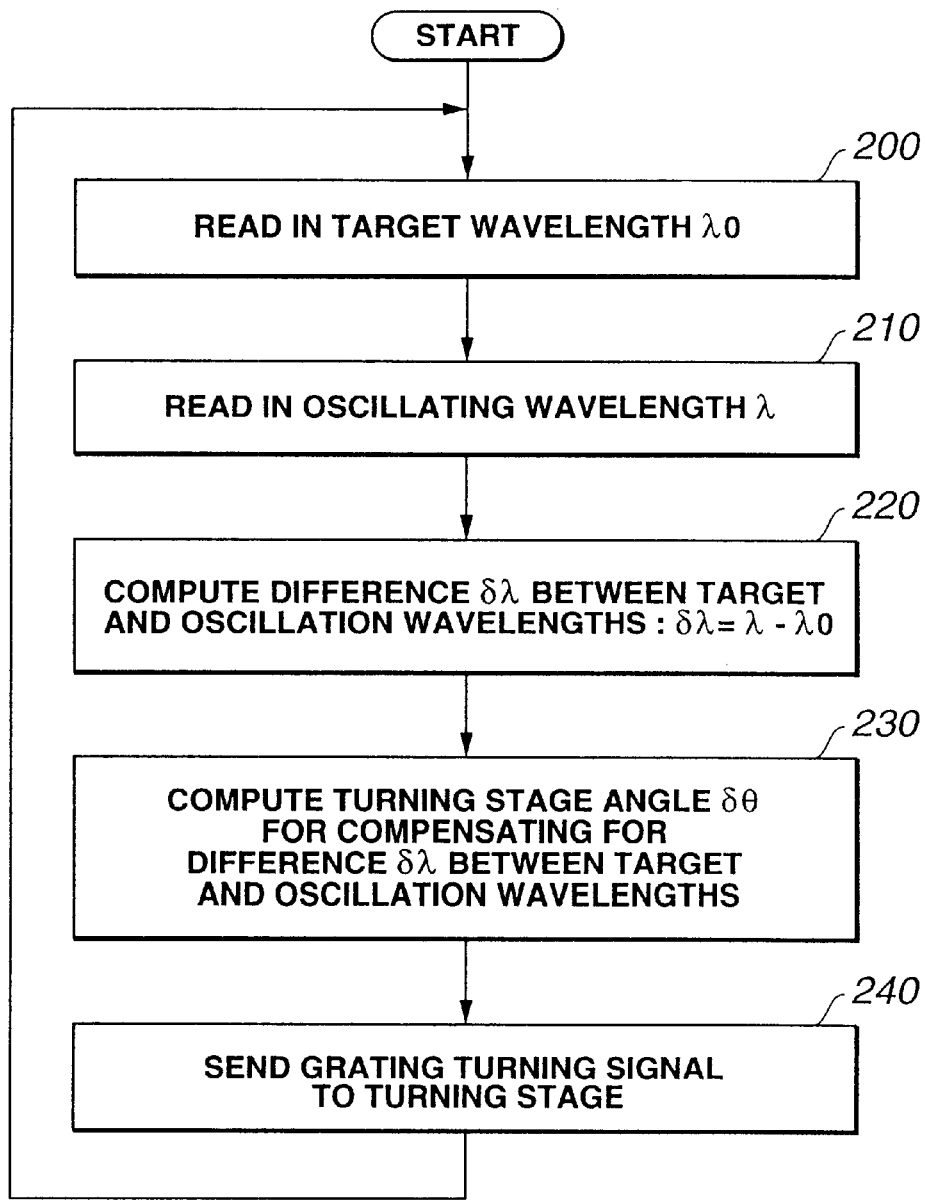
FIG. 2 is a flowchart representing a procedure for controlling wavelength by turning a grating.

In FIG. 2 is flowcharted an example of a wavelength correction procedure performed by the controller 18. The controller 18 computes the difference $\delta\lambda$ between a target wavelength $\lambda 0$ and the detected wavelength $\lambda$ detected by the monitor module 17 ($\delta\lambda = \lambda - \lambda 0$) (steps 200 to 220), computes a turning angle $\delta\theta$ for the turning stage 9a wherewith the wavelength difference $\delta\lambda$ becomes zero, and outputs a grating turning signal inclusive of that turning angle $\delta\theta$ to the turning stage 9a (steps 230 and 240).

As a result, the grating 9 is driven and turned until it attains a turning position whereat the wavelength difference $\delta\lambda$ is zero.

Figure 3:
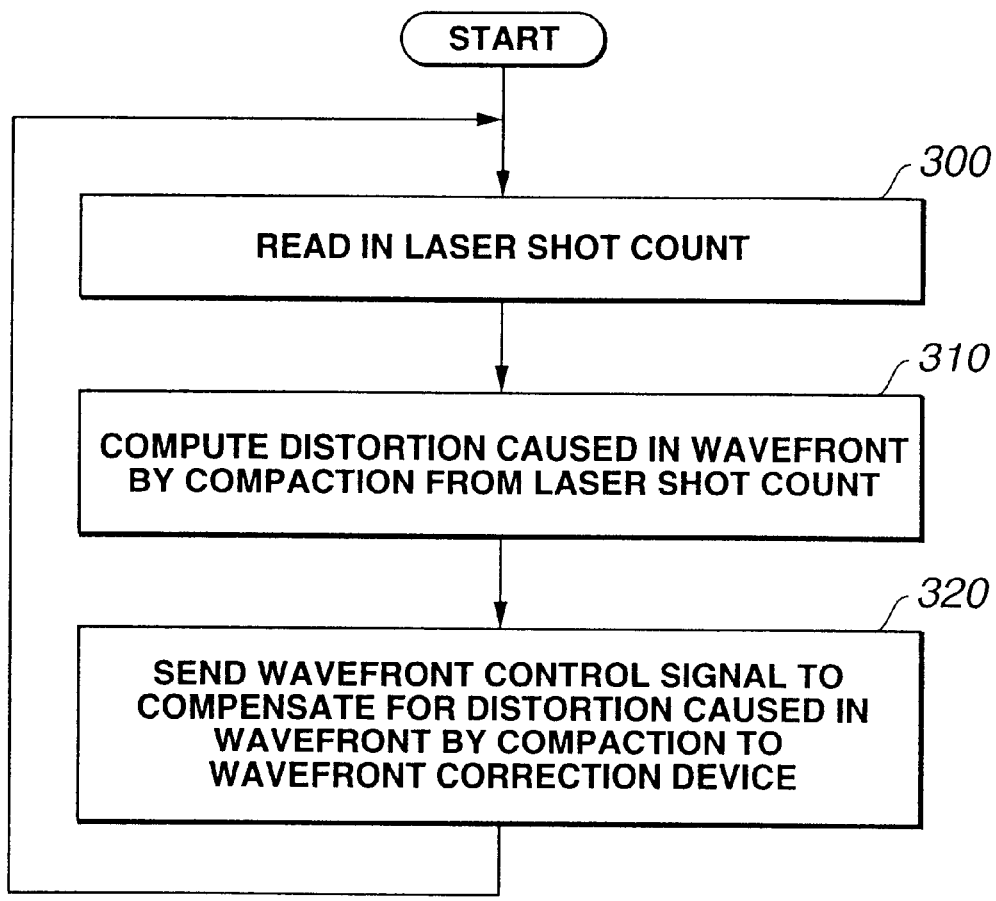
FIG. 3 is a flowchart representing a procedure for correcting wavefront distortion by compaction.

In FIG. 3 is flowcharted an example of wavefront control of the wavefront correction 10 performed by the controller 18. In this case, the compaction resulting from laser irradiation is taken into consideration in the control that is effected.

More specifically, the generation of compaction caused by laser irradiation is proportionate to the number of laser shots, wherefore the number of pulse laser beam shots is computed from the pulse energy signal detected by the photodiode 13 in the monitor module 17 (step 300), the wavefront distortion in the laser beam caused by optical element compaction, as based on the shot count, is computed (step 310), a wavefront control signal is computed to compensate for the computed wavefront distortion, and that wavefront control signal is output to the wavefront correction device 10 (step 320).

Figure 4:
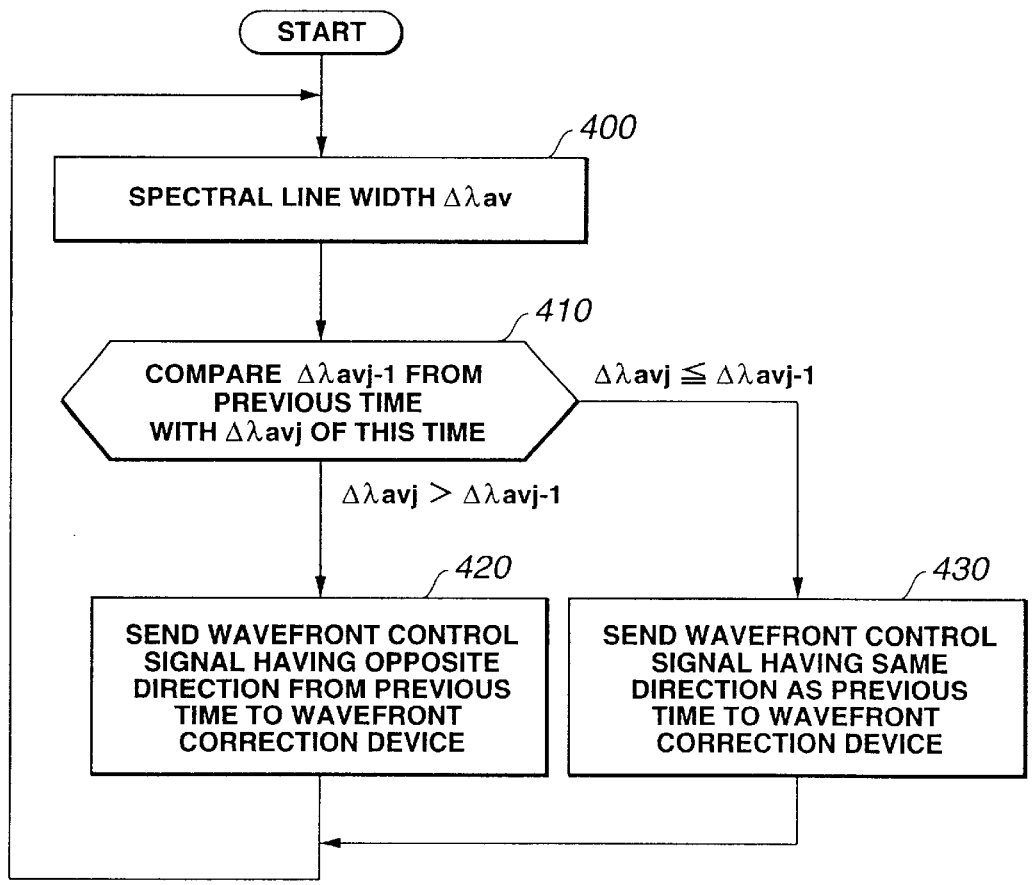
FIG. 4 is a flowchart representing a procedure for correcting wavefront distortion that minimizes the spectral line width.

In FIG. 4 is flowcharted another control procedure for the wavefront correction device 10 performed by the controller 18. In this case, the wavefront correction device 10 is controlled so that the spectral line width is minimized.

More specifically, the spectral line width $\Delta\lambda$ detected by the line photosensor 16 in the monitor module 17 is monitored pulse by pulse, and the average values $\Delta\lambda av$ of the spectral line widths $\Delta\lambda i$ to $\Delta\lambda i+n$ for n pulses Pi to Pi+n are successively derived using those monitored values. Then the previous spectral line width average value $\Delta\lambda abj-1$ and the current spectral line width average value $\Delta\lambda avj$ are compared (steps 400 and 410).

When, as a result of this comparison, $\Delta\lambda abj-1 \geq \Delta\lambda avj$, a wavefront correction signal having the same direction as the previous one is output to the wavefront correction device 10. That is, when a wavefront correction signal that distorts the wavefront in the convex direction has been output the previous time, a wavefront correction signal that distorts the wavefront in the convex direction is output this time also. When, on the other hand, a wavefront correction signal that distorts the wavefront in the concave direction has been output the previous time, a wavefront correction signal that distorts the wavefront in the concave direction is also output this time (step 420).

When $\Delta\lambda abj-1 < \Delta\lambda avj$, on the other hand, a wavefront correction signal directed in the opposite direction as previous is output to the wavefront correction device 10 (step 430).

Thus, by controlling the wavefront correction device 10 in the direction wherewith the spectral line width becomes narrower, the spectral line width will be minimized.

In the embodiment described in the foregoing, moreover, average values of spectral line widths for a plurality of pulses are compared, but it is also permissible to compare spectral line widths one shot (one pulse) at a time.

Figure 5:
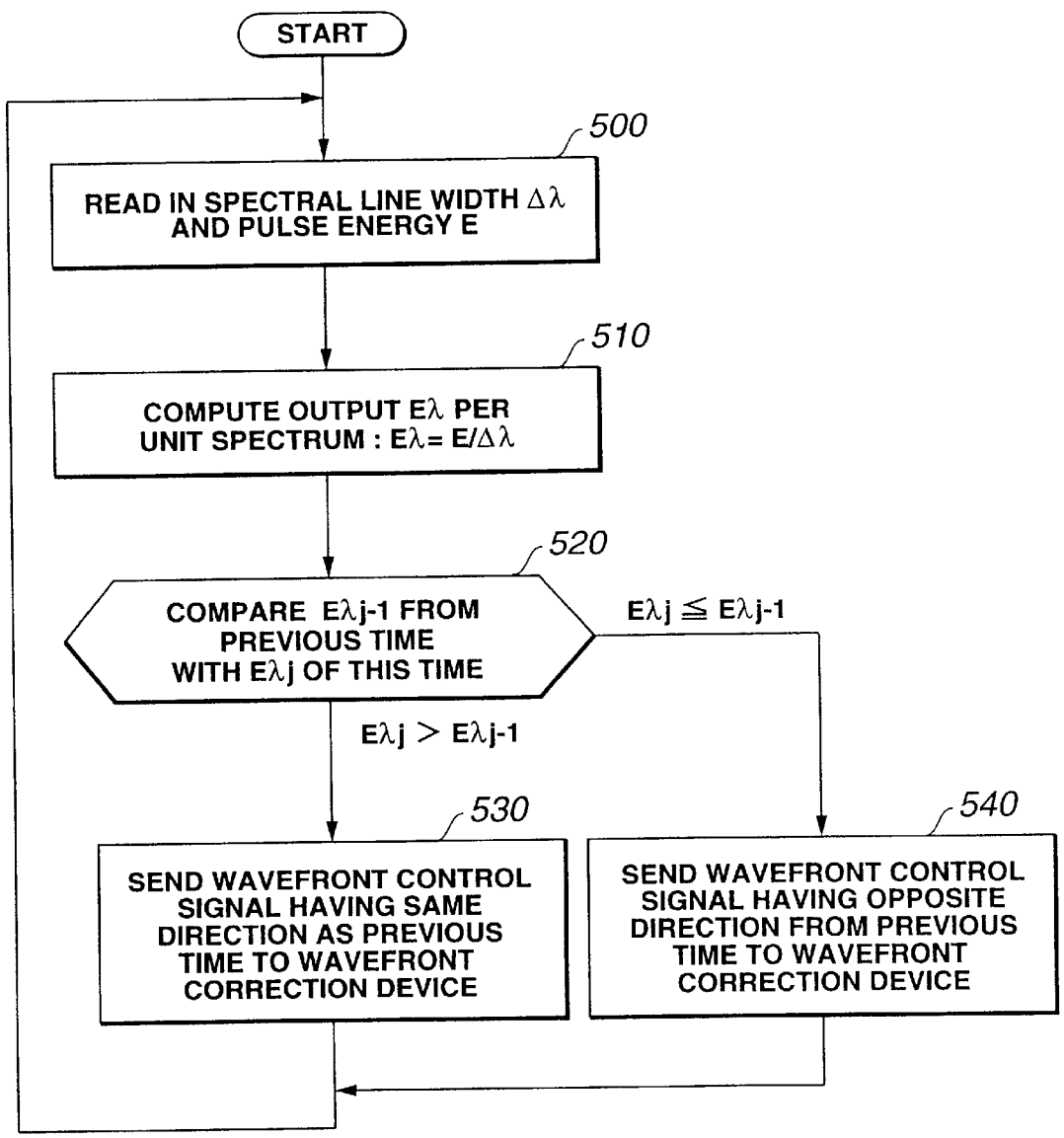
FIG. 5 is a flowchart representing a wavefront correction procedure for maximizing the output energy per unit spectral line width.

In FIG. 5 is flowcharted another control procedure for the wavefront correction device 10 performed by the controller 18. In this case the wavefront correction device 10 is controlled so that the pulse energy $E\lambda$ per unit spectral line width ($=E/\Delta\lambda$) is maximized.

More specifically, the spectral line width $\Delta\lambda$ detected by the line photosensor 16 in the monitor module 17 is monitored pulse by pulse, and the average values $\Delta\lambda av$ of the spectral line widths $\Delta\lambda i$ to $\Delta\lambda +n$ for n pulses Pi to Pi+n are derived using those monitored values. Also, in parallel therewith, the pulse energy values Ei of the output laser beams are detected from the output of the photodiode 13 of the monitor module 17, and the average values Eav of the pulse energy values Ei to Ei+n for the n pulses Pi to Pi+n are derived using those detected values.

Then, by dividing the energy value Eav by the spectral line width $\Delta\lambda av$, the pulse energy $E\lambda$ per unit spectral line width ($=Eav/\Delta\lambda av$) is found (steps 500 and 510).

Then, the computed value $E\lambda j-1$ from the previous time and the computed value $E\lambda j$ from this time are compared (step 520).

When, as a result of this comparison, $E\lambda j > E\lambda j-1$, a wavefront correction signal having the same direction as the previous one is output to the wavefront correction device 10. That is, when a wavefront correction signal that distorts the wavefront in the convex direction has been output the previous time, a wavefront correction signal that distorts the wavefront in the convex direction is output this time also, whereas, when a wavefront correction signal that distorts the wavefront in the concave direction has been output the previous time, a wavefront correction signal that distorts the-wavefront in the concave direction is also output this time (step 530).

When $\Delta E\lambda j \leq E\lambda j-1$, on the other hand, a wavefront correction signal directed in the opposite direction as previous is output to the wavefront correction device 10 (step 540).

Thus, by controlling the wavefront correction 10 in the direction wherewith the pulse energy $E\lambda$ per unit spectral line width becomes larger, the pulse energy $E\lambda$ per unit spectral line width will be maximized.

In the embodiment described in the foregoing, moreover, for the pulse energy $E\lambda$ per unit spectral line width, the average value of a plurality of pulses was used, but it is also permissible to find the pulse energy $E\lambda$ per unit spectral line width for each shot (each pulse) and compare that.

Alternatively, the output energy Ei for each pulse may be detected, and the wavefront correction device controlled so that the output energy Ei is maximized.

In the configuration diagrammed in FIG. 1, if we take the wavelength of the laser beam incident on the grating 9 as λ, the angle of incidence thereof as θ, and the inter-groove distance on the grating as d, then the diffracted light intensity will be maximized when the following equation holds true.

$$m \cdot \lambda = 2 \cdot d \cdot \sin \theta \quad (1)$$

If we transform equation (1) by differentiating the left side with λ, we obtain equation (2) below.

$$d\theta/d\lambda = (m \cdot \tan \theta)/(2 \cdot d \cdot \sin \theta) \quad (2)$$

From equations (1) and (2) above, equation (3) below is derived.

$$d\theta/d = \tan \theta/\lambda \quad (3)$$

And, from this equation (3), equation (4) below follows.

$$\Delta\lambda = (\lambda/\tan \theta) \cdot \Delta\theta \quad (4)$$

In equation (4) above, Δλ is the spectral line width, while Δθ is the spread angle of the laser beam incident on the grating.

Here, using the wavefront correction device 10 to correct wavefront aberration in the beam expander or grating will have the same effect as making Δθ roughly zero in equation (4) above. Thus it is possible thereby to minimize the left side of equation (4), that is, to minimize the spectral line width Δλ. The wavefront correction device 10 is an optical unit for making such wavefront aberration corrections.

Various specific configuration examples for the wavefront correction device 10 are now described in FIG. 6 to 20.

Figure 6A:
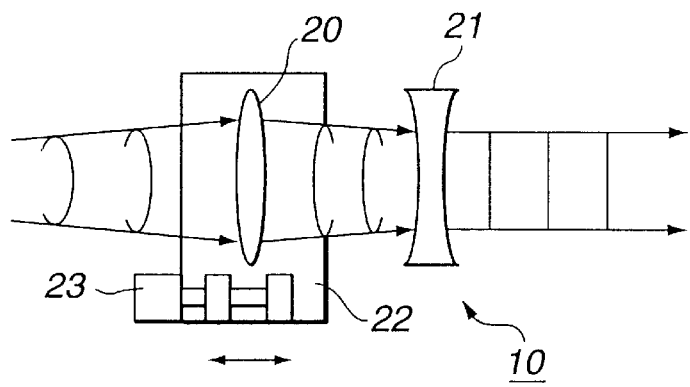
FIGS. 6(a) and 6(b) are diagrams of an example wavefront correction device.
Figure 6B:
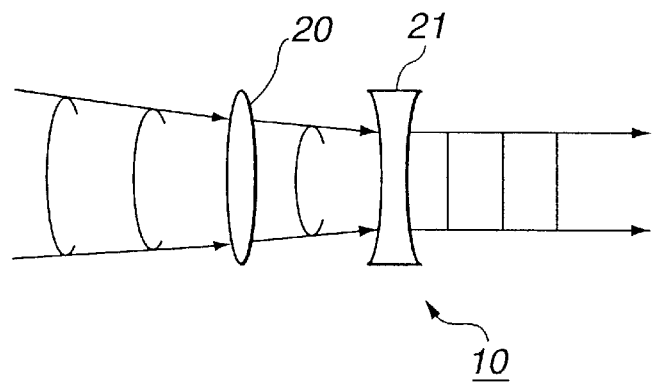

In FIG. 6, the wavefront correction 10 is configured by a convex lens 20, a concave lens 21, a moving stage 22 for moving the convex lens 20 in the direction of the optical axis, and a pulse motor 23 for driving the moving stage 22. With this configuration, input convex wavefronts or concave wavefronts are converted to plane waves according to the relative positions, in the direction of the optical axis, between the convex lens 20 and the concave lens 21. That is, when the distance between the convex lens 20 and the concave lens 21 is made larger, as diagrammed in FIG. 6(a), a convex wavefront can be converted to a plane wave, whereas, when the distance between the convex lens 20 and the concave lens 21 is made smaller, as diagrammed in FIG. 6(b), a concave wavefront can be converted to a plane wave. In the embodiment diagrammed in FIG. 6, needless to say, the concave lens 22 may be made movable.

Thus, in this second embodiment, distortion in laser beam wavefronts is corrected by adjusting the relative distance between the convex lens 20 and the concave lens 21.

Figure 7:
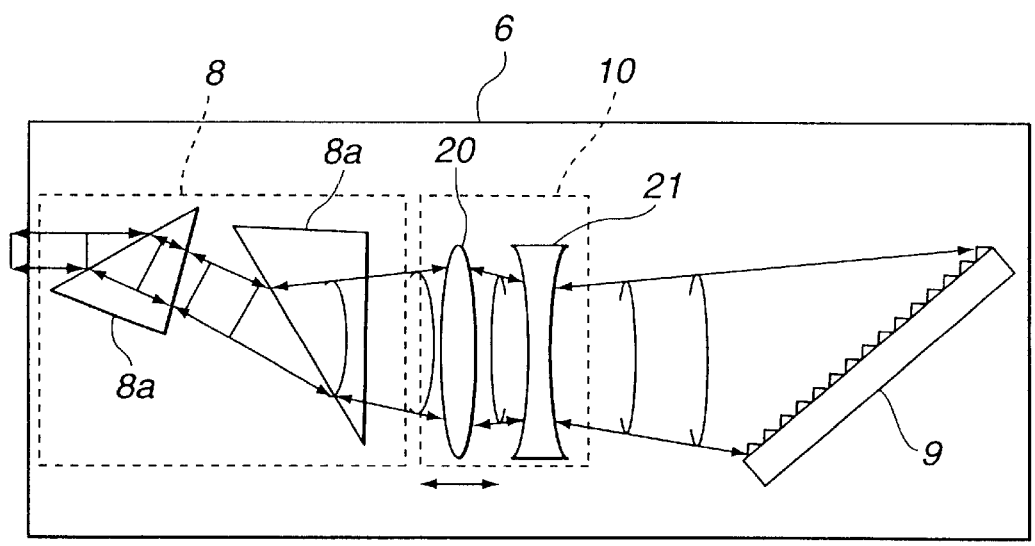
FIG. 7 is a diagram of an example of the wavefront correction device diagrammed in FIG. 6 disposed in a band narrowing module.

In FIG. 7 is diagrammed a specific example of using the wavefront correction device 10 having the configuration diagrammed in FIG. 6 in dealing with a case where wavefront aberration has developed in the grating 9. In this case, it is assumed that the grating has wavefront aberration wherewith the diffraction wavefront exhibits concave distortion.

The width of the laser beam that is input with a plane wave to the beam expander 8 of the band narrowing module 6 is expanded by two prisms 8a and 8b, and the wavefront thereof is distorted to a convex wavefront. With the wavefront correction device 10, the distance between the lenses 20 and 21 is regulated so that a laser beam having a convex wavefront that has a radius of curvature that coincides with twice the radius of curvature of the wavefront resulting from the wavefront aberration of the grating 9 is output from the wavefront correction device 10 to the grating 9, operating so as to correct the radius of curvature of laser beams having a convex wavefront input from the beam expander 10 as described above.

Accordingly, the wavefront of the laser beam diffracted by the grating 9 will become exactly the same as the wavefront of the laser beam incident on the grating 9. As a consequence, the light diffracted by the grating 9 will pass through the wavefront correction device 10 and the beam expander 10 along the reverse course from that noted earlier, whereby it will be converted to the original plane wave and output from the band narrowing module 6.

In this manner, wavefront aberration produced by optical elements in the band narrowing module 6 is corrected.

In the embodiment diagrammed in FIG. 6, moreover, instead of the convex lens 20, an optical element having equivalent functions thereto, that is, an optical element, wherewith the transmitted wavefront thereof becomes a concave wavefront, may be used. Likewise, instead of the concave lens 21, an optical element having equivalent functions thereto, that is, an optical element wherewith the transmitted wavefront thereof becomes a convex wavefront, may be used.

Also, if a prism wherewith the transmitted wavefront is concave is combined with a prism wherewith the transmitted wavefront is convex, in a configuration wherein the relative distance between these two prisms can be regulated, the functions of a prism beam expander and a wavefront correction device can both be realized therewith.

Furthermore, if a concave-wavefront prism expander is combined with a concave lens having a convex wavefront, so that the distance between those optical elements can be regulated, the prism expander having the concave wavefront can do double duty in the beam expander and in the wavefront correction device.

Figure 8A:
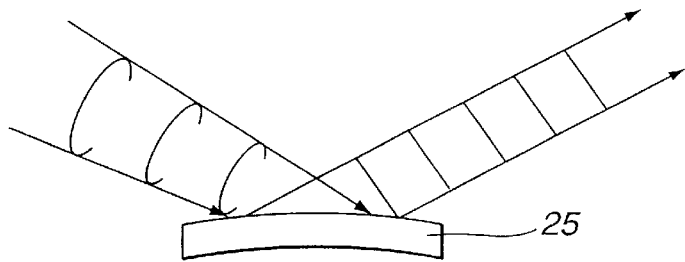
FIGS. 8(a) and 8(b) are diagrams of another example of the wavefront correction device.
Figure 8B:
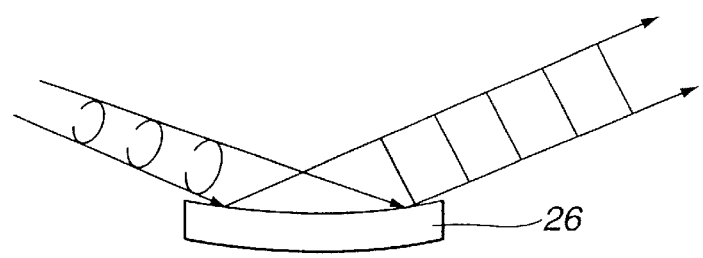

FIG. 8 diagrams another specific configuration example of the wavefront correction device 10. In this case, the wavefront correction device 10 is configured by a convex mirror 25 or a concave mirror 26. That is, with the convex mirror 25, as diagrammed in FIG. 8(a), concave input waves can be converted to plane waves, whereas with the concave mirror 26, as diagrammed in FIG. 8(b), convex input waves can be converted to plane waves.

Figure 9:
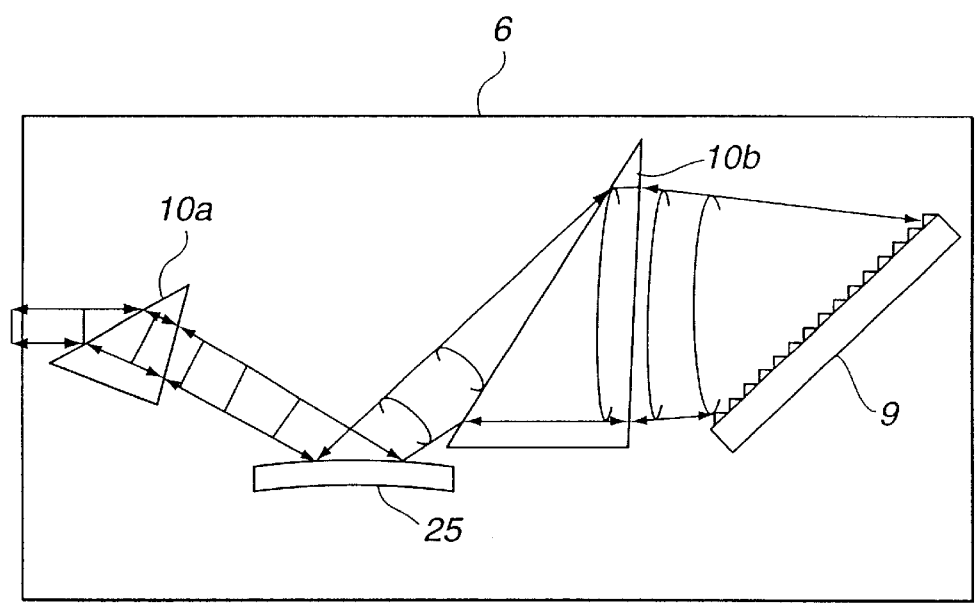
FIG. 9 is a diagram of an example of the wavefront correction device diagrammed in FIG. 8 disposed in a band narrowing module.

In FIG. 9 is diagrammed a specific example of using the wavefront correction device 10 based on the convex mirror 25 diagrammed in FIG. 8 in dealing with a case where wavefront aberration has developed in the grating 9. In this case, it is assumed that the grating 9 has wavefront aberration wherewith the diffraction wavefront exhibits convex distortion. In this .case, moreover, the wavefront correction device 10 (i.e. the convex mirror 25) is situated between the two prisms 10a and 10b in the beam expander 10.

The width of the laser beam input as a plane wave to the band narrowing module 6 is expanded by the prism 10a and sent to the convex mirror 25. The convex mirror 25 converts the incident wave that is a plane wave to a convex wave and outputs that to the prism 10b. The prism 10b further expands the beam width of the incident wave and also converts the incident wave to a concave wave and outputs that to the grating 9.

However, when this is done, the curvature of the convex mirror 25 is adjusted so that the radius of curvature of the convex wave directed to the grating 9 coincides with twice the radius of curvature of the wavefront resulting from the wavefront aberration of the grating 9.

Accordingly, the wavefront of the laser beam diffracted by the grating 9 will become exactly the same as the .wavefront of the laser beam incident on the grating 9. As a consequence, the light diffracted by the grating 9 will pass through the prism 10b, the convex mirror 25, and the prism 10a along the reverse course from that noted earlier, whereby it will be converted to the original plane wave and output from the band narrowing module 6.

In this manner, wavefront aberration produced by optical elements in the band narrowing module 6 is corrected.

Figure 10A:
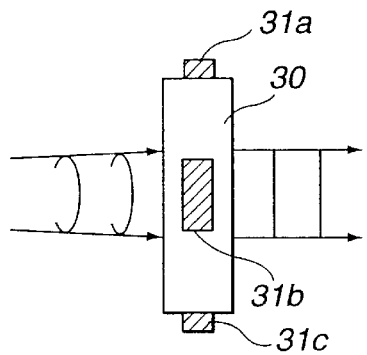
FIGS. 10(a) to 10(c) are diagrams of another examples of the wavefront correction device.

In FIG. 10 is diagrammed another specific configuration example of the wavefront correction device 10.

In FIG. 10, the wavefront correction device 10 is realized by controlling the temperature distribution in a transmissive optical element substrate.

In general, the refractive index of optical materials varies according to temperature. That being so, a refractive index distribution can be generated by deliberately imparting a temperature distribution to an optical element. In particular, with synthetic quartz glass, which exhibits a very small coefficient of thermal expansion but a refractive index that is greatly dependent on temperature, the shape of the transmitted wavefront can be controlled without producing distortion (double refraction).

Figure 10B:
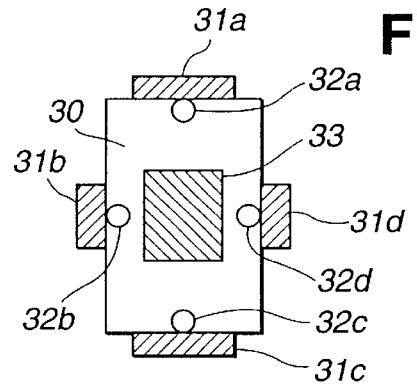
Figure 10C:
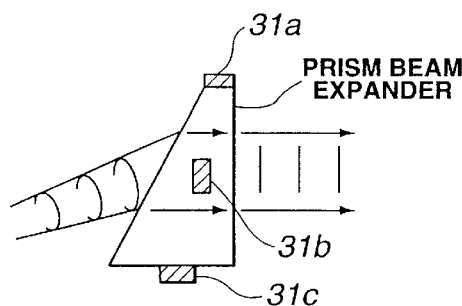

More specifically, as diagrammed in FIG. 10 at (a) and (b), heating-cooling devices 31a to 31d that are thermoelectric elements or the like capable of heating and cooling are disposed on each of the four sides of a quartz glass substrate 30. The temperatures of the substrate 30 near where the heating-cooling devices 31a to 31d are disposed are detected by temperature sensors 32a to 32d. The heating-cooling devices 31a to 31d are temperature-controlled so that, based on the values detected by the temperature sensors 32a to 32d, the quartz glass.substrate 30 exhibits the prescribed temperature distribution. Thus the desired refractive index distribution is effected in the quartz glass substrate 15. In FIG. 10(b), moreover, item 33 is the area through which the laser beams pass.

Figure 11:
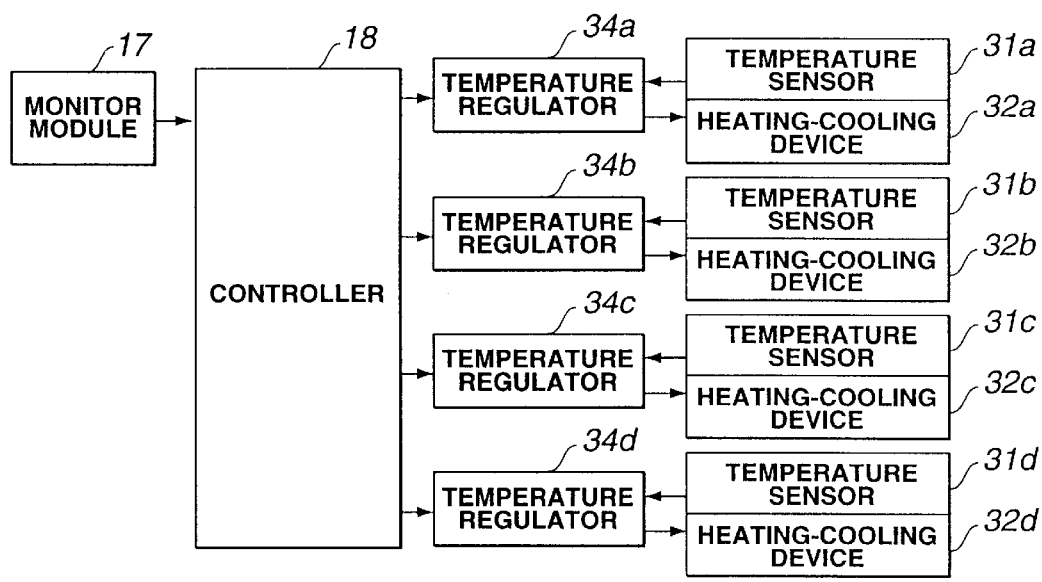
FIG. 11 is a diagram of an example control configuration for the wavefront correction device diagrammed in FIG. 10.

These heating-cooling devices 31a to 31d and temperature sensors 32a to 32d disposed on the four sides of the quartz glass substrate 30 are connected to temperature regulators 34a to 34d, as diagrammed in FIG. 11, and driven by those temperature regulators 34a to 34d. The temperature regulators 34a to 34d are connected to the controller 18 indicated earlier in FIG. 1, and the heating-cooling devices 31a to 31d are temperature-controlled by temperature-command signals from the controller 18. More specifically, in the controller 18, computations are performed as described with FIG. 3 to 5 earlier, based on values monitored by the monitor module 17, etc., a wavefront correction signal is computed, for the wavefront correction device 10, setting temperatures for the heating-cooling devices 31a to 31d are computed in response to that wavefront correction signal, and the setting temperature signals so computed are sent to the temperature regulators 34a to 34d.

When the wavefront of the laser beam input to this wavefront correction device 10 is convex, for example, if the refractive index of the center portion of the substrate 30 is raised and the refractive index around the edges thereof is lowered, the laser beam passing though that wavefront correction device 10 will become a plane wave. Therefore, the heating-cooling devices 31b and 31d disposed near the center of the substrate 30 are given lower temperature settings while the heating-cooling devices 31a and 31c disposed at the edges thereof are given higher temperature settings. Conversely, by implementing temperature settings that are the opposite of those, a wavefront correction device can be realized wherewith incident waves having concave wavefronts can be converted to plane waves.

In the embodiment described in the foregoing, furthermore, the number of heating-cooling devices and the way they are disposed are entirely discretionary. If, as diagrammed in FIG. 12, for example, many (eight in this case) heating-cooling devices 31a to 31h and temperature sensors 32a to 32h are disposed on the side surfaces of the quartz glass substrate 30, the temperature distribution on the substrate, and thus the refractive index distribution, can be controlled with high precision, thus making it possible to correct,not only simple concave or convex wavefronts, but also wavefronts that have two ridges. As diagrammed in FIG. 10(c), moreover, heating-cooling devices can be disposed in a prism beam expander and wavefronts controlled in the same manner as described in the foregoing.

Figure 13A:
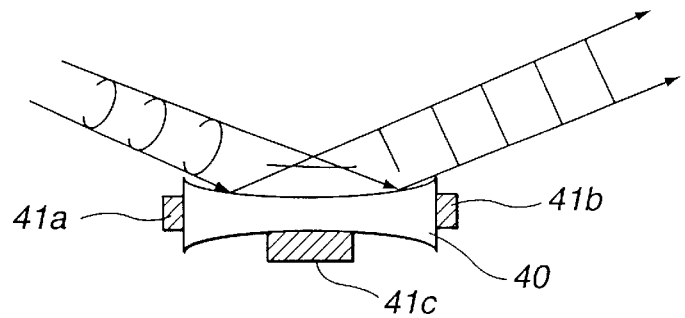
FIGS. 13(a) and 13(b) are diagrams of another example of the wavefront correction device.
Figure 13B:
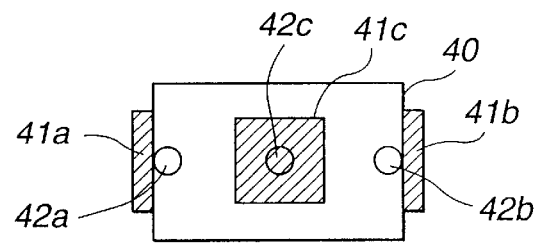

FIG. 13 is a diagram of yet another configuration example for the wavefront correction device 10.

In FIG. 13, the coefficient of thermal expansion of the substrate is regulated by controlling the temperature distribution of a reflective optical element substrate, and the reflective optical element:substrate is caused to be curved into a concave or convex shape.

More specifically, as diagrammed in FIG. 13 at (a) and (b), heating-cooling devices 41a to 41c that -are thermoelectric elements or the like capable of heating and cooling are disposed on the bottom and side surfaces of a reflecting mirror 40 formed by a glass substrate exhibiting a pre-scribed.coefficient of thermal expansion, together with temperature sensors 42a to 42c near where the heating-cooling devices 41a to 41c are disposed.

Figure 12A:
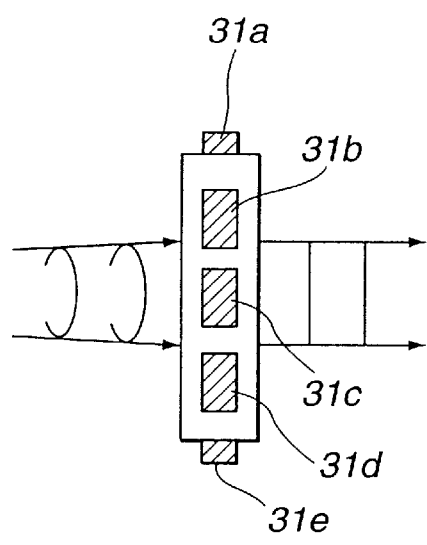
FIGS. 12(a) and 12(b) are diagrams of an example modification of the wavefront.correction device diagrammed in FIG. 10.
Figure 12B:
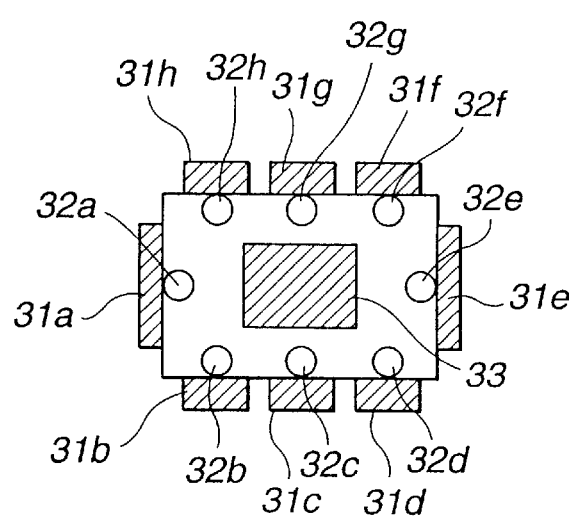
Figure 14:
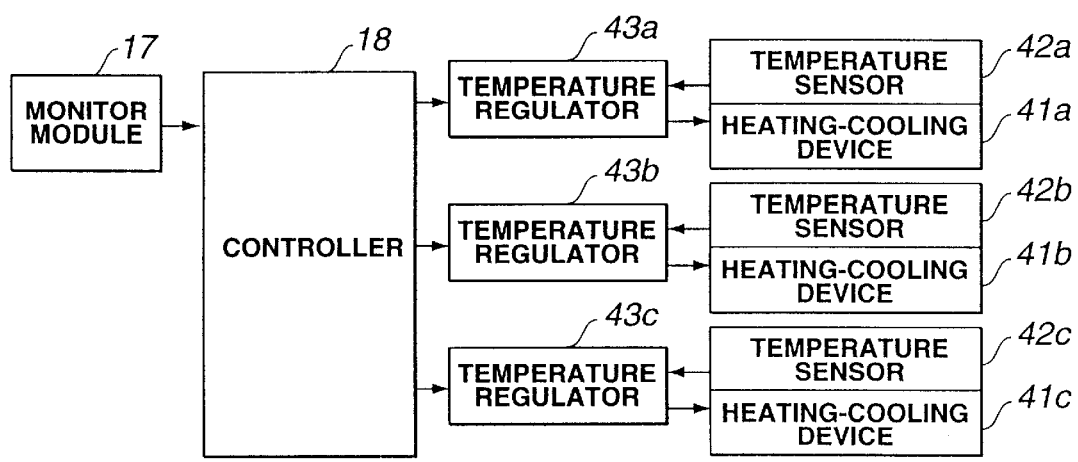
FIG. 14 is a diagram of an example control configuration for the wavefront correction device diagrammed in FIG. 13.
Figure 15:
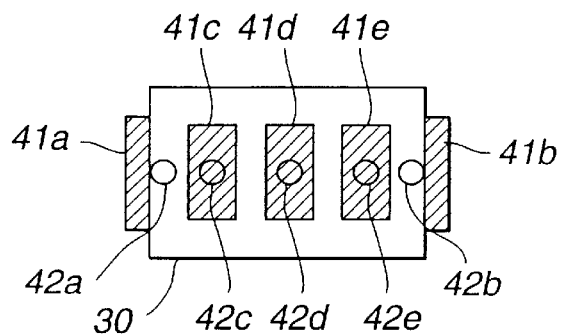
FIG. 15 is a diagram of an example modification of the wavefront correction device diagrammed in FIG. 13.

Also, as diagrammed in FIG. 14, these heating-cooling devices 41a to 41c and temperature sensors 42a to 42c are connected to temperature regulators 43a to 43c, and the heating-cooling devices 41a to 41c are controlled by the controller 18 via the temperature regulators 43a to 43c, as in the embodiment diagrammed in FIG. 11 and FIG. 12.

When the wavefront of the laser beam input to this wavefront correction device 10 is convex, for example, if the reflecting mirror 40 is made a concave mirror, the reflecting wavefront thereof will be a plane wave. Therefore, the heating-cooling device 41c disposed on the bottom surface in the center of the substrate 40 is given a low temperature setting while the heating-cooling devices 41a and 41b disposed at the edges of the substrate 4 are given low temperature settings. By so doing, the center of the substrate is made to curve inward while the edges of the substrate are made thicker, thus forming a concave mirror having the desired curvature. Conversely, by implementing temperature settings that are opposite to these, a convex mirror can be formed.

In the embodiment described in the foregoing, the number of heating-cooling devices and the way in which they are disposed are entirely discretionary. If many (in this case three) heating-cooling devices 41a to 41e and temperature sensors 42a to 42e are disposed on the bottom surface of the quartz glass substrate 30, as diagrammed in FIG. 15, for example, the temperature distribution of the substrate, and thus the coefficient of thermal expansion distribution, can be controlled with higher precision, and incident wavefronts of more complex shape can then be corrected.

FIG. 16 is a diagram of yet another example configuration of the wavefront correction device 10.

Figure 16A:
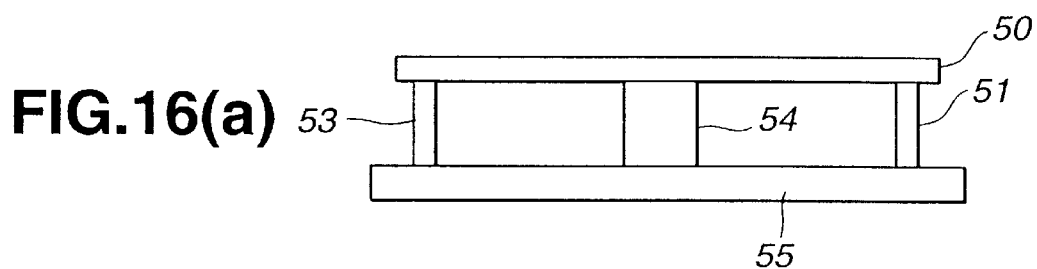
FIGS. 16(a) to 16(c) are diagrams of another example of the wavefront correction device.
Figure 16B:
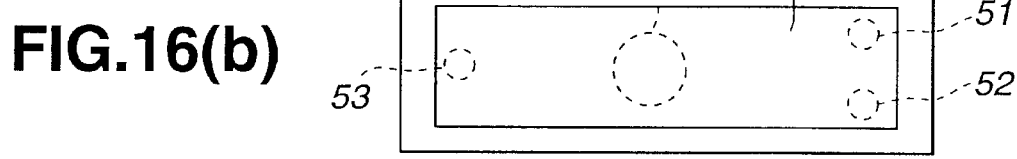
Figure 16C:
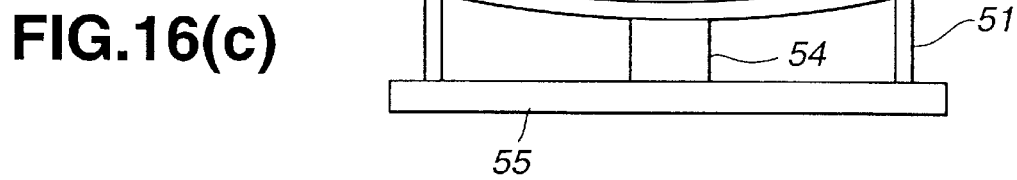

In FIG. 16, physical force is actually applied to a reflecting optical element substrate in order to distort the reflecting surface thereof FIG. 16(a) is a front elevation representing the state prior to bending, and FIG. 16(b) is a plan thereof FIG. 16(c) is a front elevation representing the state after bending.

More specifically, in this embodiment, the back side of a reflecting mirror substrate 50 is supported by three support columns 51 to 53, while an extendable-retractable actuator 54 is provided which extends and retracts in the middle of the back side of the substrate 50 in the height direction thereof The three support columns 51 to 53 and the extendable-retractable actuator 54 are secured to a support plate 55.

For the extendable-retractable actuator 54, a piezoelectric element (piezoelectric element) or metal or plastic piece that expands and contracts with heat may be used.

In FIG. 16(c), the configuration is such that a concave mirror is formed when the extendable-retractable actuator 54 is retracted. If the extendable-retractable actuator 54 is extended, then a convex mirror can be formed.

In the embodiment diagrammed in FIG. 16, furthermore, the extendable-retractable actuator 54 disposed in the center of the reflecting mirror 50 may be made a member of fixed length that cannot be extended or retracted and the members 51 to 53 disposed at the edges of the reflecting mirror may be made extendable-retractable members that can be extended and retracted.

Alternatively, all of the support members disposed, both at the center and at the edges of the reflecting mirror 50, may be made extendable-retractable members that can be freely extended and retracted. In that case, if the direction of extension or retraction is made opposite between the extendable-retractable actuators disposed at the edges and the extendable-retractable actuator disposed at the center, when seeking to impart the same curvature to the reflecting mirror as with the configuration comprising an extendable-retractable member or members only either at the center or at the edges, this may be accomplished with half the length of extension or retraction of the extendable-retractable actuator.or actuators. In such a case that is, the range of possible curvature that can be imparted to the mirror is doubled.

Figure 17:
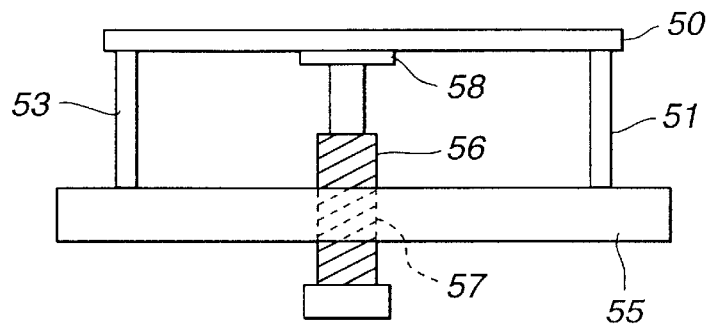
FIG. 17 is a diagram of yet another example of the wavefront correction device.

In FIG. 17, the extendable-retractable actuator 54 diagrammed in FIG. 16 is configured as a screw member 56. That is, in this case, a hole 57 wherein are formed screw threads is formed in the center of the support plate 55, the screw member 56 is screwed into that hole 57, the tip of the screw member 56 is made so that it is secured to the back side of the reflecting mirror 50 through a joining member 58, the interval between the support plate 55 and the center of the reflecting mirror 50 is made variable by turning the screw member 56, and a configuration is thus realized wherein the reflecting mirror 50 can be bent into a concave or a convex shape.

Figure 18A:
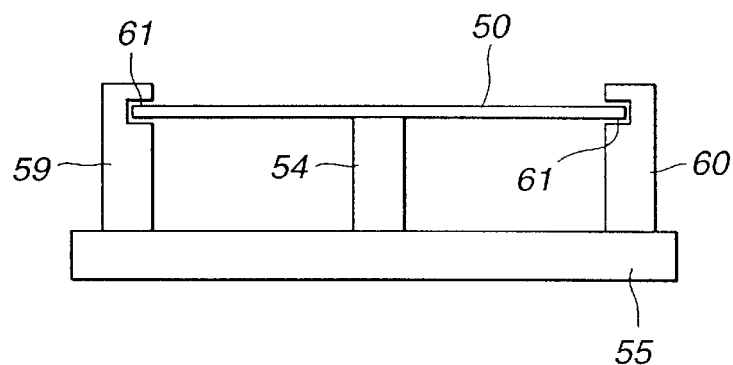
FIGS. 18(a) and 18(b) are diagrams of yet another example of the wavefront correction device.
Figure 18B:
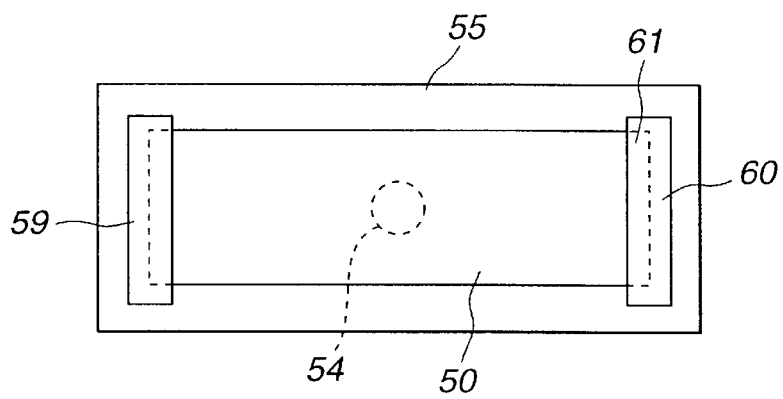

FIG. 18 represents an example modification of what is diagrammed in FIG. 16, wherein both ends of the reflecting mirror 50 are engaged in concavities 61 formed in support members 59 and 60, the two ends of the reflecting mirror 50 are supported by the concavities 61, and the mirror reflecting surface is bent to either a concave or convex shape by the extensions and retractions of an extendable-retractable actuator 54 disposed near the center of the reflecting mirror 50.

Figure 19:
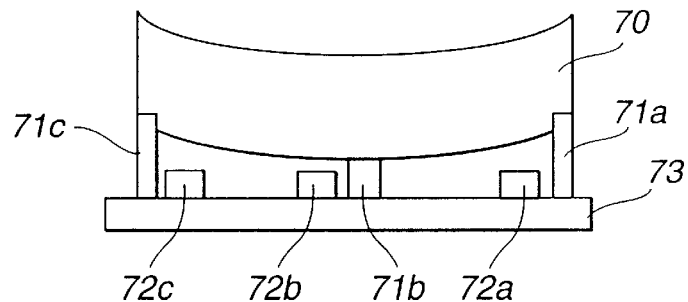
FIG. 19 is a diagram of yet another example of the wavefront correction device.

FIG. 19 is a diagram of yet another example configuration for the wavefront correction device 10.

In FIG. 19, multiple piezoelectric elements 71a to 71c are disposed between the back side of a reflecting mirror 70 and a sup port plate 73. The amount of expansion or contraction in these multiple piezoelectric elements 71a to 71c is controlled, and physical forces are actually applied to the reflecting mirror 70 in order to induce distortions in the reflecting surface. Multiple displacement sensors 72a to 72c are also disposed on the support plate 73, so that the gap distances from these displacement sensors 72a to 72c to the reflecting mirror are measured by the multiple displacement sensors 72a to 72c. Electrostatic capacitance type displacement gauges, for example, are used for the displacement sensors 72 that measure the gap distances.

Figure 20:
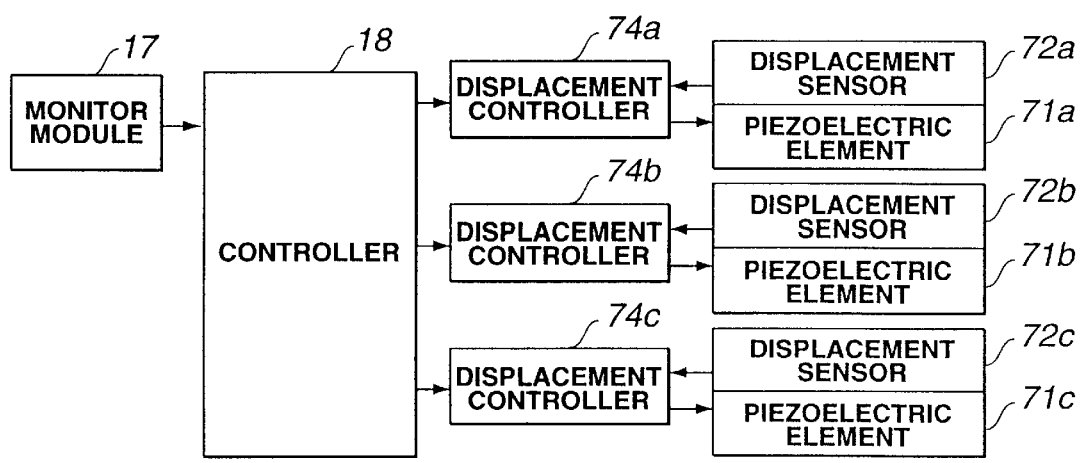
FIG. 20 is a diagram of an example control configuration for the wavefront correction device diagrammed in FIG. 19.

As diagrammed in FIG. 20, moreover, these piezoelectric elements 71a to 71c and displacement sensors 72a to 72c are connected to displacement controllers 74a to 74c, and the piezoelectric elements 71a to 71c are controlled by the controller 18 via the displacement controllers 74a to 74c, in the same manner as in the embodiments diagrammed in FIG. 11 and FIG. 12 earlier.

Figure 21:
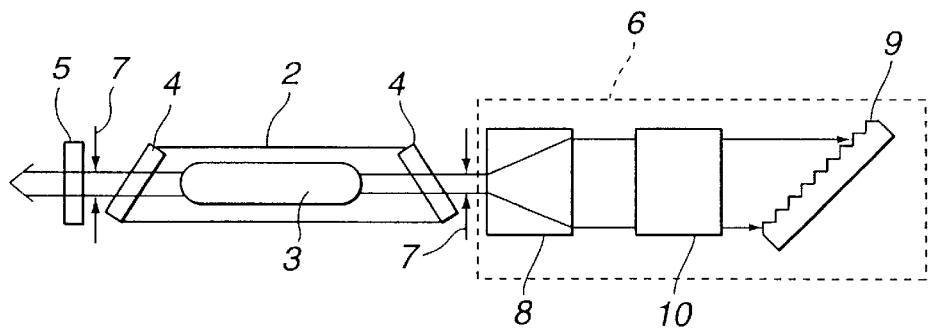
FIG. 21 is a diagram of another example deployment of the wavefront correction device in a band narrowing module.
Figure 22:
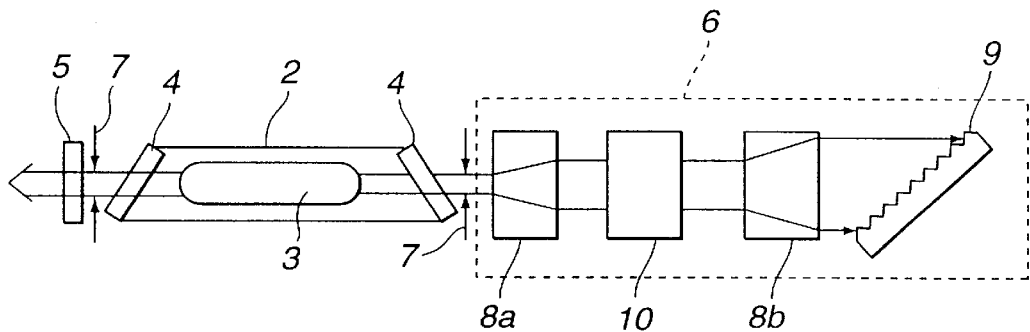
FIG. 22 is a diagram of yet another example deployment of the wavefront correction device in a band narrowing module.

Now, in the embodiment diagrammed in FIG. 1, the wavefront correction device 10 is disposed between the beam expander 8 and the laser chamber 2. However, the wavefront correction device 10 may be disposed between the beam expander 8 and the grating 9, as diagrammed in FIG. 21, or it may be disposed between two separated beam expanders 8a and-8b, as diagrammed in FIG. 22.

Figure 23:
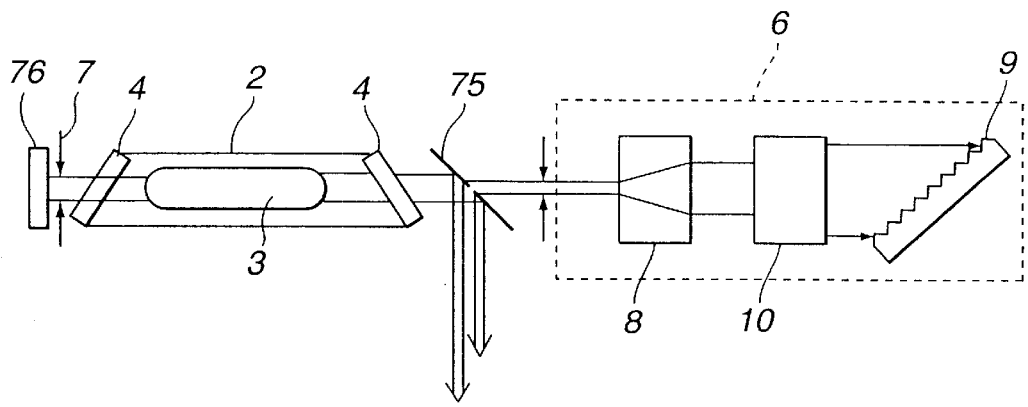
FIG. 23 is a diagram of a configuration wherein another resonator structure is applied to the present invention.
Figure 24:
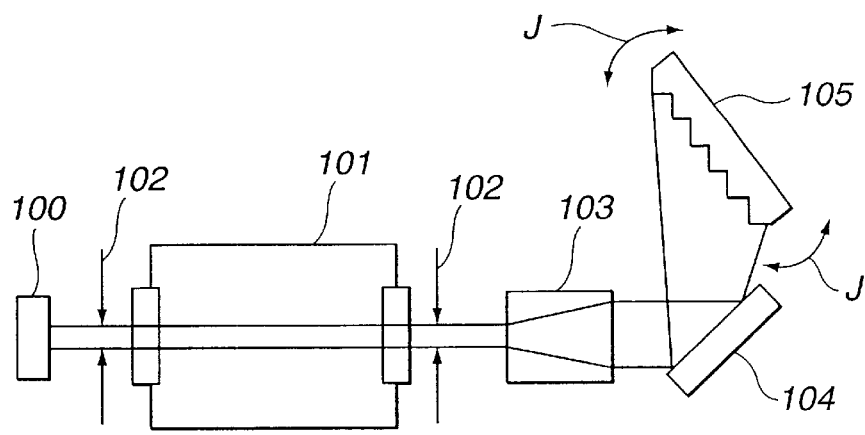
FIG. 24 is a diagram representing prior art.
Figure 25:
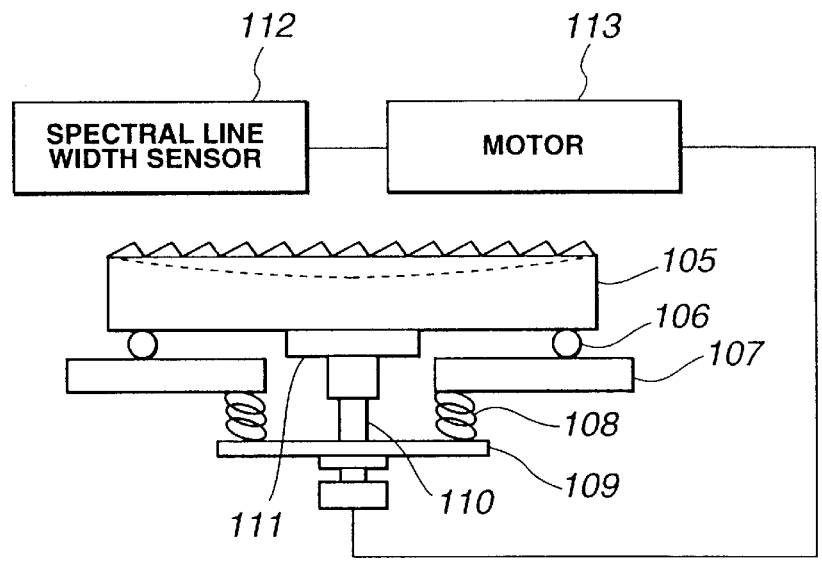
FIG. 25 is a diagram representing prior art.
Figure 26:
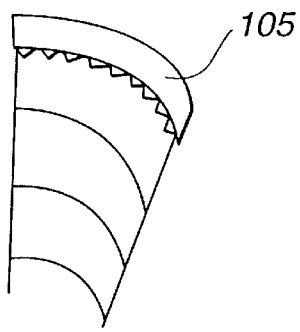
FIG. 26 is a diagram of a grating in the prior art.

Alternatively, the wavefront correction device 10 may be disposed in an excimer laser band narrowing module 6 having an oscillator-amplifier type of resonator structure, as diagrammed in FIG. 23.

More specifically, in the resonator structure diagrammed in FIG. 23, a laser beam generated from the laser chamber 2 passes through a hole in a perforated mirror 75 and proceeds to the beam expander 8 where the beam width is expanded, after which the wavefront is corrected by the wavefront correction device 10 and the laser beam is directed to the grating 9. Diffracted light that is wavelength-selected by this grating 9 proceeds through the wavefront correction device 10, the beam expander 8, and the hole in the perforated mirror 75 and is input into the laser chamber 2 where, after being further amplified, it passes through the completely reflecting mirror 76 and laser chamber 2 and strikes the perforated mirror 75. One portion of the light that is incident on the perforated mirror 75 is here reflected and returned as output light while the remainder thereof passes through the hole and is again input to the band narrowing unit 6.

The present invention may also be applied to other resonator structures such as polarized light-coupled resonators, and injection type, unstable resonators, etc.

In the embodiment diagrammed in FIG. 1, furthermore, a retro-disposed grating 9 is employed as the wavelength selecting optical element. However, instead thereof, combinations of diffusing prisms and rear mirrors, combinations of etalons and rear mirrors, or combinations of gratings in diagonal-incidence deployments and rear mirrors may be employed.

It is also permissible to omit the beam expander 8. The wavefront correction device 10 is not limited to one unit, moreover, but a number of units may be disposed between the laser chamber and the wavelength selecting element.

INDUSTRIAL APPLICABILITY

The configuration is made so that distortions in the wavefronts of laser beams generated inside band narrowing modules are corrected, wherefore it is possible to efficiently and stably output laser beams having a very narrow spectrum.

What is claimed is:

1. A band narrowing laser including a band narrowing module having a beam expander and an angle-dispersing wavelength-selecting element, for band-narrowing a laser beam generated from a laser medium by the band narrowing module, characterized in that:

the band narrowing module comprises wavefront changing means for changing wavefront of incident laser beam and outputting the laser beam and regulating means for regulating a degree of wavefront change made by the wavefront changing means, disposed between the laser medium and the angle-dispersing wavelength-selecting element.

2. The band narrowing laser according to claim 1, characterized in that the wavefront changing means comprises:
a first optical element having a convex lens function; and
a second optical element having a concave lens function, and
the regulating means comprises:
distance regulating means for regulating a relative distance between the first and second optical elements.

3. The band narrowing laser according to claim 1, characterized in that the wavefront changing means comprises:
a reflecting optical element for reflecting incident laser beam; and
the regulating means comprises:
a concave-convex regulation means for pending reflecting surface of the reflecting optical element to regulate concave-convex date thereof.

4. The band narrowing laser according to claim 3, characterized in that the concave-convex regulating means comprises:
a plurality of support members for supporting the reflecting optical element, at least a portion or portions of the support members being configured so that they can expand and contract freely;
a securing member or members that secure the ends of the plurality of support members; and
expansion-contraction control means for controlling expansion and contraction of the freely expanding and contracting support members so that a preset, prescribed bending is imparted to the reflecting optical element.

5. The band narrowing laser according to claim 4, characterized in that the freely expanding and contracting support members are configured by piezoelectric elements.

6. The band narrowing laser according to claim 1, further comprising monitor means for monitoring the laser beam generated from the laser medium, and control means for controlling the regulating means based on a value monitored by the monitor means.

7. The band narrowing laser according to claim 6, characterized in that: the monitor means has spectral line width detection means for d detecting spectral line width of output laser beams; and the control means controls the regulating means based on values detected by the spectral line width detection means.

8. A band narrowing laser including a band narrowing module for band-narrowing a laser beam generated from a laser medium and wavefront correction means for correcting wavefront of an incident laser beam and outputting the laser beam, disposed inside the module, characterized in that:
the wavefront correction means comprises:
a transmissive optical element for transmitting the incident laser beam;
a plurality of heating-cooling devices dispose outside the services of the transmissive optical element; and
temperature control means for temperature-controlling the heating-cooling devices and regulating temperature distribution in the transmissive optical element so as to affect a pre-set, prescribed refractive index distribution or correct the wavefront of the incident laser beam.

9. A band narrowing laser including a band narrowing module having a band narrowing element for band-narrowing a laser beam generated from a laser medium, and wavefront correction means for correcting wavefront of an incident laser beam and outputting the laser beam, disposed inside the band narrowing module, characterized in that:
the wavefront correction means comprise:
a reflecting optical element for reflecting the incident laser beam, configured of a material exhibiting a prescribed coefficient of thermal expansion; and
concave-convex regulating means for bending reflecting surface of the reflecting optical element to regulate concave-convex state thereof, and
the concave-convex regulating means comprises:
one or a plurality of heating-cooling devices disposed on a back side of the reflecting optical element; and
temperature regulating means for controlling the one or plurality of heating-cooling devices so that preset, prescribed bending is imparted to the reflecting optical element.

10. A band narrowing laser including a band narrowing module having a band narrowing element for band-narrowing a laser beam generated from a laser medium; wavefront correction means for correcting wavefront of an incident laser beam and outputting the laser beam, disposed inside the band narrowing module, characterized in that the band narrowing laser comprises:
monitor means for monitoring the laser beam generated from the laser medium; and
control means for controlling wavefront corrections made by the wavefront correction means, based on a value monitored by the monitor means,
the monitor means comprises shot count detection means for detecting number of output laser beam shots; and
the control means controls the wavefront corrections made by the wavefront correction means, based on values detected by the shot count detection means.

11. A band narrowing laser including a band narrowing module having a band narrowing element for band-narrowing a laser beam generated from a laser medium; wavefront correction means for correcting, wavefront of an incident laser beam and outputting the laser beam, disposed inside the band narrowing module, characterized in that the band narrowing laser comprises:
monitor means for monitoring the laser beam generated from the laser medium; and
control means for controlling wavefront corrections made by the wavefront correction means, based on a value monitored by the monitor means,
the monitor means comprises:
spectral line width detection means for detecting spectral line width of the output laser beam; and
output energy detection means for detecting an output energy value of the output laser beam; and
the control means comprises:
division means for dividing the energy value detected by the output energy detection means by the spectral line width detected by the spectral line width detection means; and
wavefront correction control means for controlling wavefront corrections made by the wavefront correction means so that a quotient value of the division means is maximized.

12. A band narrowing laser including a band narrowing module having a band narrowing element for band-narrowing a laser beam generated from a laser medium; wavefront correction means for correcting wavefront of an incident laser beam and outputting the laser beam, disposed inside the band narrowing module, characterized in that the band narrowing laser comprises:

monitor means for monitoring the laser beam generated from the laser medium; and control means for controlling wavefront corrections made by the wavefront correction means, based on values monitored by the monitor means, the monitor means comprises output energy detection means for detecting an output energy value of the output laser beam; and the control means comprises wavefront correction control means for controlling wavefront corrections made by the wavefront correction means so that the energy value detected by the output energy detection means is maximized.

* * * * *